Patented Sept. 24, 1935

2,015,429

UNITED STATES PATENT OFFICE 2,015,429

AZO-DYESTUFFS

Herbert Kracker and Richard Schmid, Frankfort-on-the-Main-Hochst, Germany, assignors to General Aniline Works, Inc., New York, N. Y., a corporation of Delaware No Drawing. Application November 26, 1934, Serial No. 754,912. In Germany December 1, 1933

4 Claims. (Cl. 260—87)

The present invention relates to azo-dyestuffs; more particularly it relates to dyestuffs of the following general formula:

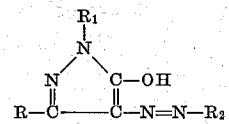

wherein R stands for a radical of the benzene or naphthalene series, $R_1$ for hydrogen or methyl, $R_2$ for a radical of the benzene, naphthalene or diphenyl series, and wherein at least one of the radicals R and $R_2$ contains at least one substituent of the group consisting of sulfonic acid and carboxylic acid groups.

We have found that azo-dyestuffs of very good fastness properties are obtainable by combining diazotized bases with pyrazolones of the following constitution:

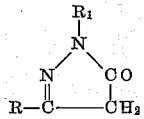

wherein $R_1$ stands for hydrogen or alkyl and R for an aryl radical, the dyestuffs components being chosen that the dyestuffs contain at least one group lending solubility in water, such as, for instance, the sulfonic acid or carboxylic acid group.

The new dyestuffs dye wool from an acid bath yellow to red tints of very good fastness properties. In comparison with the analogous pyrazolone-azo-dyestuffs, which are substituted in 3-position of the pyrazolone nucleus by a methyl, carboxylic acid or carboxylic acid ester group, the dyestuffs of the present invention are distinguished by an enhanced fastness to washing and to fulling. When compared with the azo-dyestuffs from 1,3-diphenyl-5-pyrazolone, described in "Berichte der Deutschen Chemischen Gesellschaft", vol. 35, (1902), pages 928–929, and in German Patent No. 253,287, the new dyestuffs possess a better fastness to washing and to light.

By using dyestuff-components which contain groups capable of being chromed, such as, for instance, a hydroxyl, carboxyl or arylsulfamino group standing in ortho-position to the diazo group of the base applied, or the grouping of a carboxyl or arylsulfamino group standing in ortho-position to a hydroxyl group, dyeings on wool are obtained which, after being treated with agents yielding chromium, are distinguished by properties of fastness which surpass those of the unchromed dyestuffs.

The pyrazolones used for the preparation of the dyestuffs may be obtained by condensing aroyl acetic esters of the formula:

$$R\text{—}CO\text{—}CH_2\text{—}COOR''$$

with hydrazines of the formula:

wherein R and $R_1$ have the same meaning as in the above formula for the pyrazolones, and wherein R'' stands for an alkyl radical, to form the hydrazones and then closing the pyrazolone ring.

The following examples serve to illustrate the invention, but they are not intended to limit it thereto; the parts are by weight:

(1) 17.3 parts of ortho-aniline-sulfonic acid are dissolved in 300 parts of water and 25 parts of hydrochloric acid of 20° Bé. and diazotized with 6.9 parts of sodium-nitrite in the form of a 2 N. solution. This diazo-solution is introduced into a solution of 20.4 parts of 3-(4'-carboxyphenyl)-5-pyrazolone which has been rendered alkaline by means of sodium carbonate. When the coupling is finished, the dyestuff is salted out by means of sodium chloride, filtered and dried. It corresponds to the following formula:

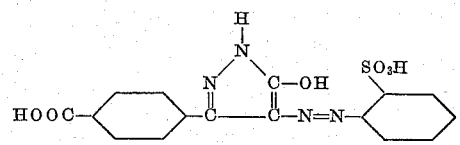

and dyes wool from an acid bath greenish-yellow tints of very good fastness to washing and to light.

(2) 25 parts of the solid diazo compound from 1-amino-2-naphthol-4-sulfonic acid are stirred with 100 parts of water and introduced at 20° C., while stirring, into a solution of 16 parts of 3-phenyl-5-pyrazolone which has been rendered alkaline by means of caustic soda. The completely dissolved dyestuff is precipitated by acidification, filtered and dried. It has the following formula:

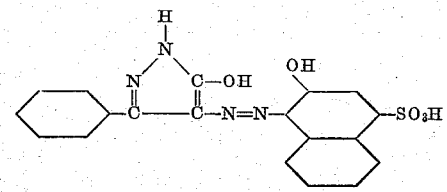

and dyes wool from an acid bath red tints of very good fastness to washing and to light. By aftertreating the dyeing with chromium salts the fastness properties may still be enhanced.

(3) By using in Example 1, instead of ortho-aniline-sulfonic acid, 21.7 parts of 2-amino-4-sulfo-1-benzoic acid and, as coupling component, 17.4 parts of 1-methyl-3-phenyl-5-pyrazolone in a solution which has been rendered alkaline by means of caustic soda and working up in the manner described in Example 1 there is obtained after salting out, filtering and drying the dyestuff of the following formula:

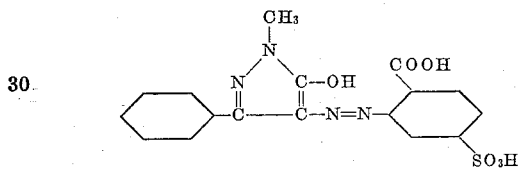

which dyes wool from an acid bath yellow tints of good fastness properties. By after-treating the dyeing with chromium salts, the fastness properties may be enhanced.

(4) 22.3 parts of 2-naphthylamine-1-sulfonic acid are dissolved in a sodium carbonate solution, and 6.9 parts of sodium nitrite are added in the form of a 2 N. solution. The clear solution is diazotized by introducing it into a mixture of 20 parts of raw hydrochloric acid and ice. The diazo solution is then run into a solution of 21.8 parts of 1-methyl-3-(4'-carboxyphenyl)-5-pyrazolone which has been rendered alkaline by means of sodium carbonate. When the coupling is finished, the dyestuff is salted out, filtered with suction and dried. It corresponds to the following formula:

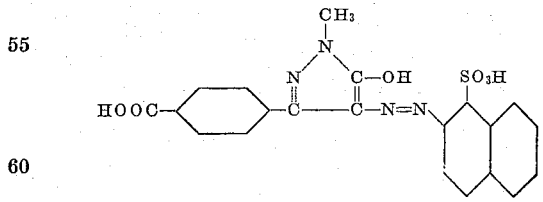

and dyes wool from an acid bath orange tints of good fastness properties.

By using other diazotizing or coupling components there may be obtained, in a similar manner, dyestuffs the dyeings of which possess likewise good fastness properties. The following table indicates a number of further dyestuffs which are obtainable according to the present invention:

| | Diazotizing component | Coupling component | Tint on wool |
|---|---|---|---|
| 1 | 4-chloroaniline-2-sulfonic acid | 3-(4'-chlorophenyl)-5-pyrazolone | Yellow. |
| 2 | 4-nitro-2-aminophenol-6-sulfonic acid | 3-(4'-methoxyphenyl)-5-pyrazolone | Brownish-red. |
| 3 | 1-amino-2-carboxybenzene-4-sulfonic acid | 3-(α-naphthyl)-5-pyrazolone | Reddish-yellow. |
| 4 | 4-toluidine-3-sulfonic acid | 3-(4'-carboxyphenyl)-5-pyrazolone | Yellow. |
| 5 | 4-chloro-2-aminophenol-6-sulfonic acid | do | Red. |
| 6 | nitro-1-amino-2-naphthol-4-sulfonic acid | do | Bluish-red. |
| 7 | sulfanilic acid | 1-methyl-3-phenyl-5-pyrazolone | Yellow. |
| 8 | 3-nitro-5-amino-2-hydroxy-1-benzoic acid | 1-methyl-3-(4'-methylphenyl)-5-pyrazolone | Brownish-orange. |
| 9 | 1-amino-2-naphthol-4-sulfonic acid | 1-methyl-3-(β-naphthyl)-5-pyrazolone | Red. |
| 10 | metanilic acid | 1-methyl-3-(4'-carboxyphenyl)-5-pyrazolone | Greenish-yellow. |
| 11 | 4,4'-diaminodiphenyl-3,3'-disulfonic acid | do | Red. |
| 12 | 6-nitro-2-aminophenol-4-sulfonic acid | do | Brownish-red. |

We claim:

1. The azo-dyestuffs of the following general formula:

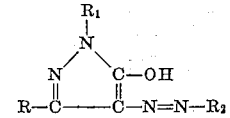

wherein R stands for a radical of the benzene or naphthalene series, $R_1$ for hydrogen or methyl, $R_2$ for a radical of the benzene, naphthalene or diphenyl series, and wherein at least one of the radicals R and $R_2$ contains at least one substituent of the group consisting of sulphonic acid and carboxylic acid groups, dyeing wool from an acid bath yellow to red tints of very good fastness properties.

2. The azo-dyestuff of the following formula:

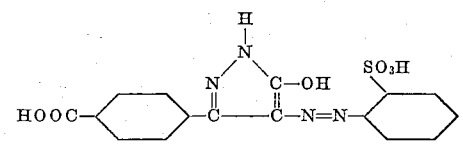

dyeing wool from an acid bath greenish-yellow tints of very good fastness to washing and to light.

3. The azo-dyestuff of the following formula:

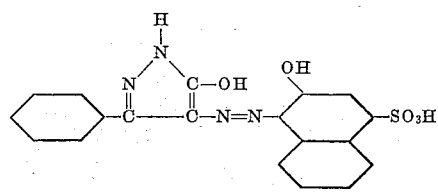

yielding on wool, when after-chromed, a red dyeing of very good fastness to washing and to light.

4. The azo-dyestuff of the following formula:

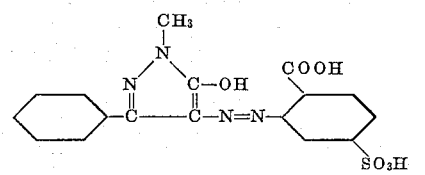

yielding on wool, when after-chromed, a yellow dyeing of very good fastness properties.

HERBERT KRACKER.
RICHARD SCHMID.